H. R. HEYL,

Assignor to G. W. HEYL.

DEVICE FOR INSERTING METALLIC STAPLES.

No. 9,803. Reissued July 12, 1881.

Witnesses:

John A. Riedesheim

L. Douville.

Inventor:

Henry R. Heyl, by Isaac H. Heysinger

ATTORNEY.

THE NORRIS PETERS CO. PHOTO-LITHO., WASHINGTON, D. C.

UNITED STATES PATENT OFFICE.

HENRY R. HEYL, OF PHILADELPHIA, PENNSYLVANIA, ASSIGNOR TO GEORGE W. HEYL, OF SAME PLACE.

DEVICE FOR INSERTING METALLIC STAPLES.

SPECIFICATION forming part of Reissued Letters Patent No. 9,803, dated July 12, 1881.

Original No. 195,603, dated September 25, 1877. Application for reissue filed May 10, 1881.

*To all whom it may concern:*

Be it known that I, HENRY R. HEYL, of the city and county of Philadelphia and State of Pennsylvania, have invented a new and useful Improvement in Paper-Fasteners, which improvement is fully set forth in the following specification and accompanying drawings, in which—

Figure 1:
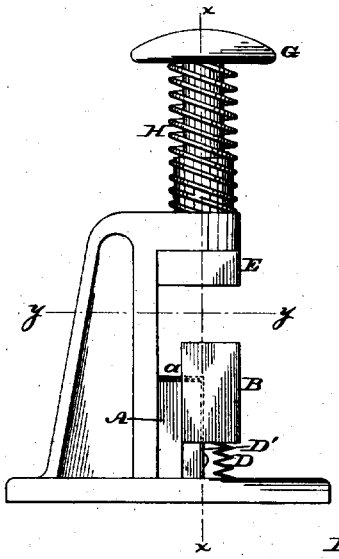
Figure 2:
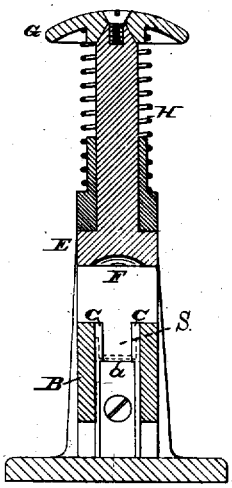
Figure 4:
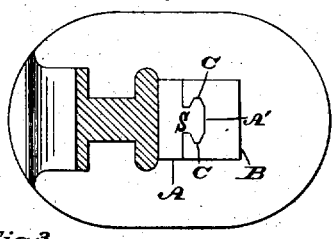
Figure 3:
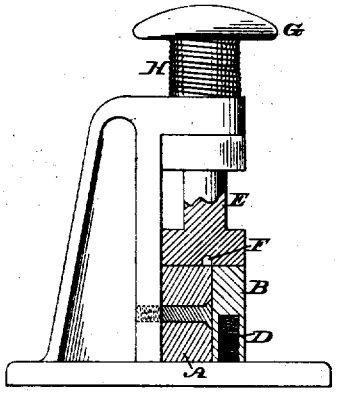
Figure 5:
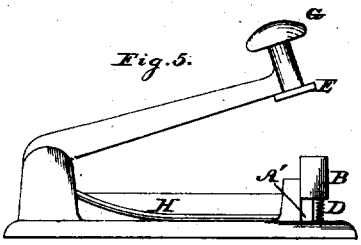
Figures 6, 7, 8:
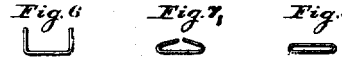

Figures 1 and 5 are side elevations of the fastener embodying my invention. Fig. 2 is a vertical section in line *x x*, Fig. 1. Fig. 3 is a side elevation, partly sectional. Fig. 4 is a horizontal section in line *y y*, Fig. 1.

Similar letters of reference indicate corresponding parts in the several figures.

My invention consists of an implement of the form of a hand-stamp, by which metallic staples may be forced through sheets of paper or documents and secured by clinching the legs on the reverse side.

Referring to the drawings, A′ represents a stationary anvil, which is secured to or formed with an arm rising from a suitable stand of convenient form for use upon a writing-desk; and B represents a sliding guide-block fitted to the anvil A′ by a sliding joint, and having grooves C C, which match with the tongue of the anvil, the upper face of the block being flat. The normal position of the guide B is elevated, and in order to keep it in this position, or from dropping prematurely, I employ a spring, D, which may press up under the guide, or a spring, D′, which may press against it, and thus produce the necessary friction. E represents a reciprocating driver whose under face is flat, and in the same is a concave recess, F, said driver having a knob, G, for receiving the blows of the hand, and provided with a spring, H, for causing the return or elevation of the driver.

The operation is as follows: A staple is placed within the grooves C C with its crown resting on the anvil A′, the points thus being turned toward the bending-recess F. The papers to be united are now placed beneath the driver, and by a sharp blow of the hand upon the knob G the driver is forced downward upon the papers. The staple-legs come through the papers into the recess F, where they are bent over by the slanting ends thereof.

It will be seen that the grooves C C serve to support and guide the staple-legs during their penetration through the papers, and the recess F is so shaped that as the staple-legs enter thereinto they will strike the concave or slanting walls of said recess, and thus be bent inward toward each other, as shown in Figs. 2 and 3. A plate, *a*, may be advantageously employed to overlap the staple-crown, for preventing the latter from bending while the legs are being forced through the papers.

It will be seen that the staple-support or anvil A′, with the slotted or recessed hammer, operates to insert a staple through layers of stock to be united, and simultaneously bends over its projecting ends.

In my original specification I described the further separate operation of completely flattening down the ends of the staple thus bent over by a second blow between the upper and lower jaw of the implement, believing that the same was new; but I have since learned that the same result was obtained by devices described in previous Letters Patent of the United States. Should the legs of the staple, when bent over by the same blow which drives the same, as is hereinabove described, be found not to lie sufficiently close to the surfaces of the paper, the same may be further flattened down by a second blow between flat surfaces in front of the staple-channel and bending-recess respectively provided therefor.

Figs. 1, 2, and 3 show a hand-stamp embodying my invention, in which the driver reciprocates in a fixed head in the manner of a plunger, while Fig. 5 shows the same invention embodied in a hand-stamp, in which the driver is mounted at the end of a vibrating arm pivoted at its rear extremity to the base, which rests upon the table.

It will be seen that the devices which constitute my invention are to be found in both these modifications, and that both operate in precisely the same manner to insert, by a blow upon the knob G of the hand-stamp, the staple through layers of stock to be united, and simultaneously bend over the projecting ends in the opposite bending-recess provided therefor.

Having thus described my invention, what I claim as new, and desire to secure by Letters Patent, is—

1. The combination of the stationary staple-support or anvil A′ and the sliding staple-guide B with the reciprocating slotted or recessed hammer operating to insert a staple through layers of stock to be united, and simultaneously bend over its projecting ends, substantially as and for the purpose set forth.

2. In a device for inserting metallic staples, the combination of the staple-guide B, anvil A′, spring D, and reciprocating driver, provided with the knob G, the whole arranged to operate substantially as and for the purpose set forth.

3. A staple-inserting implement having two opposite jaws arranged with relation to each other, substantially as shown, one of which is provided with a recess, the other with a vertically-channeled staple-guide, an anvil, and a spring, so that when the jaws are separated after driving a staple the guide will be open for the reception of the succeeding staple, substantially as described.

4. An implement for inserting metallic staples, consisting of two opposite jaws, one of which is provided with a staple-bending recess, and the other with staple-guiding grooves and an anvil fitted thereto, in combination with a knob to receive the blow of the hand and insert a staple by a sudden percussion, substantially as described.

5. In a staple-inserting machine constructed to operate substantially as described, the staple-guiding block B, having staple-holding grooves C C, forming side extensions of the vertical slot S, substantially as shown and described.

6. An implement for inserting metallic staples, consisting of two opposite jaws, one of which is provided with a staple-bending recess, and the other with staple-guiding grooves and an anvil fitted therein, the said jaws being arranged to be separated and stand apart to admit the requisite manipulation for conveniently placing a staple in the open end of the said staple-guiding grooves, substantially as set forth.

7. The combination of the stationary staple-support or anvil A′ with the sliding guide B, grooved to partially embrace and guide the staple-legs, substantially as and for the purpose set forth.

8. In an implement for inserting metallic staples, a reciprocating driver provided with a knob to receive the blow of the hand, in combination with a grooved staple-guiding block and an anvil attached to a stand of convenient form for use upon a writing-desk, the said stand having an arm rising therefrom, and over and above it a guide for the purpose of guiding the said driver to the said anvil, substantially as and for the purpose set forth.

HENRY R. HEYL.

Witnesses:
P. O'DONNELL,
F. L. ROEPKE.